Sept. 3, 1957

P. A. COFFMAN, JR 2,805,417

CONTINUOUS WEIGHER

Filed Jan. 27, 1956

4 Sheets-Sheet 1

INVENTOR.
PAUL A. COFFMAN, JR.
BY
Barlow & Barlow
ATTORNEYS

Sept. 3, 1957 P. A. COFFMAN, JR 2,805,417
CONTINUOUS WEIGHER
Filed Jan. 27, 1956 4 Sheets-Sheet 2

FIG.2

INVENTOR.
PAUL A. COFFMAN, JR.
BY
Barlow & Barlow
ATTORNEYS

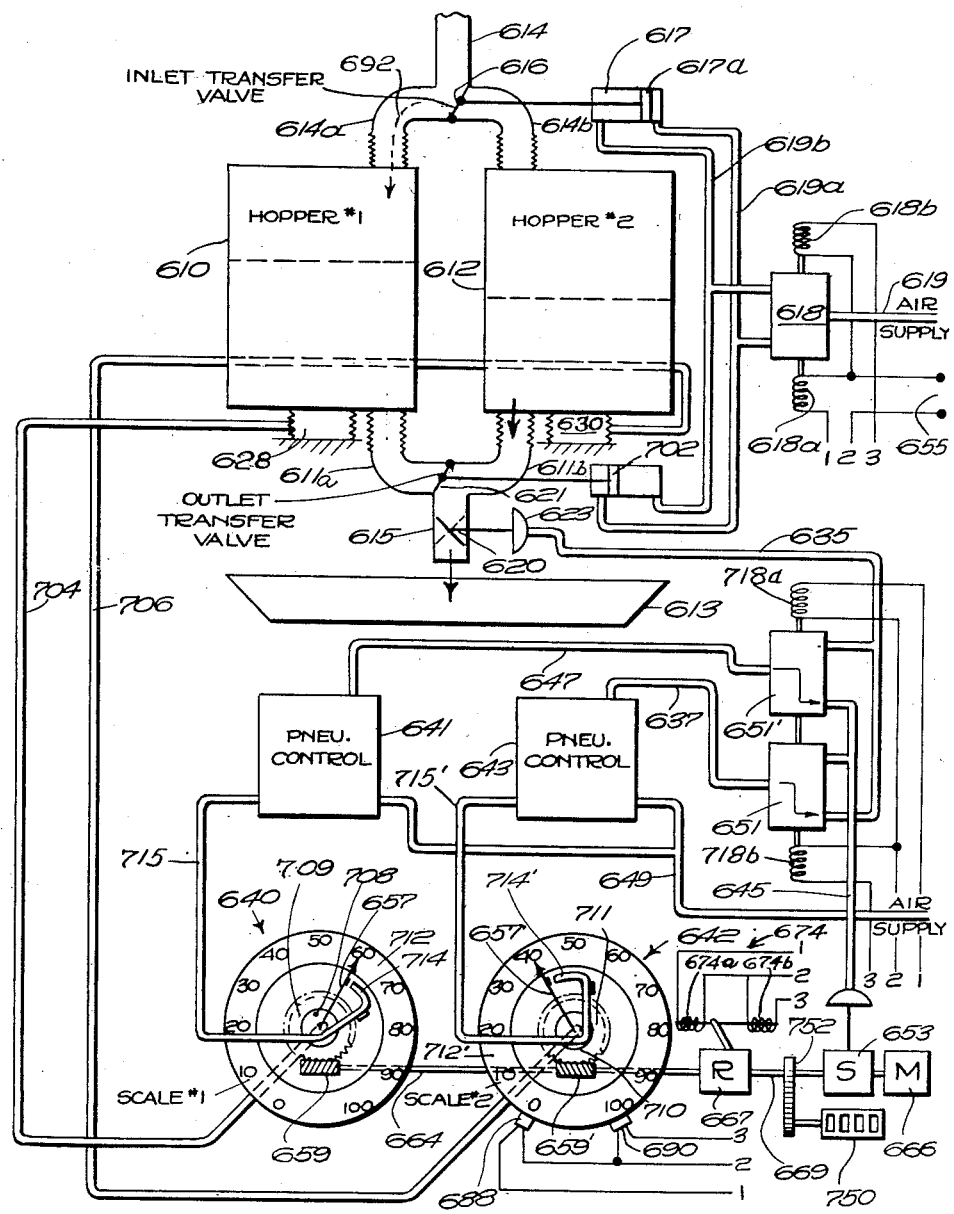

United States Patent Office 2,805,417
Patented Sept. 3, 1957

2,805,417

CONTINUOUS WEIGHER

Paul A. Coffman, Jr., Warwick, R. I., assignor to B-I-F Industries, Inc., a corporation of Rhode Island Application January 27, 1956, Serial No. 561,893

10 Claims. (Cl. 249—27)

This invention relates to apparatus for continuously weighing material, which may be liquid, granular, or powdered, and is a continuation in part of my applications Serial No. 325,682, filed December 12, 1952, and Serial No. 456,840, filed September 17, 1954, now abandoned.

One object of the present improvement is to provide a continuous weighing type of apparatus which comprises two containers, one of which discharges material while the other is being charged, and automatic control means responsive to the near emptying of the discharging container to shift the discharging action from it to the now charged container and the charging action to the near emptied container.

Another object is to provide a continuous weighing apparatus which will discharge material from one container at a rate which is substantially the same as the rate at which additional material is simultaneously being supplied to the other container therein.

Still another object is to provide a weighing apparatus which totalizes the weight of material that has been supplied.

Figure 1:
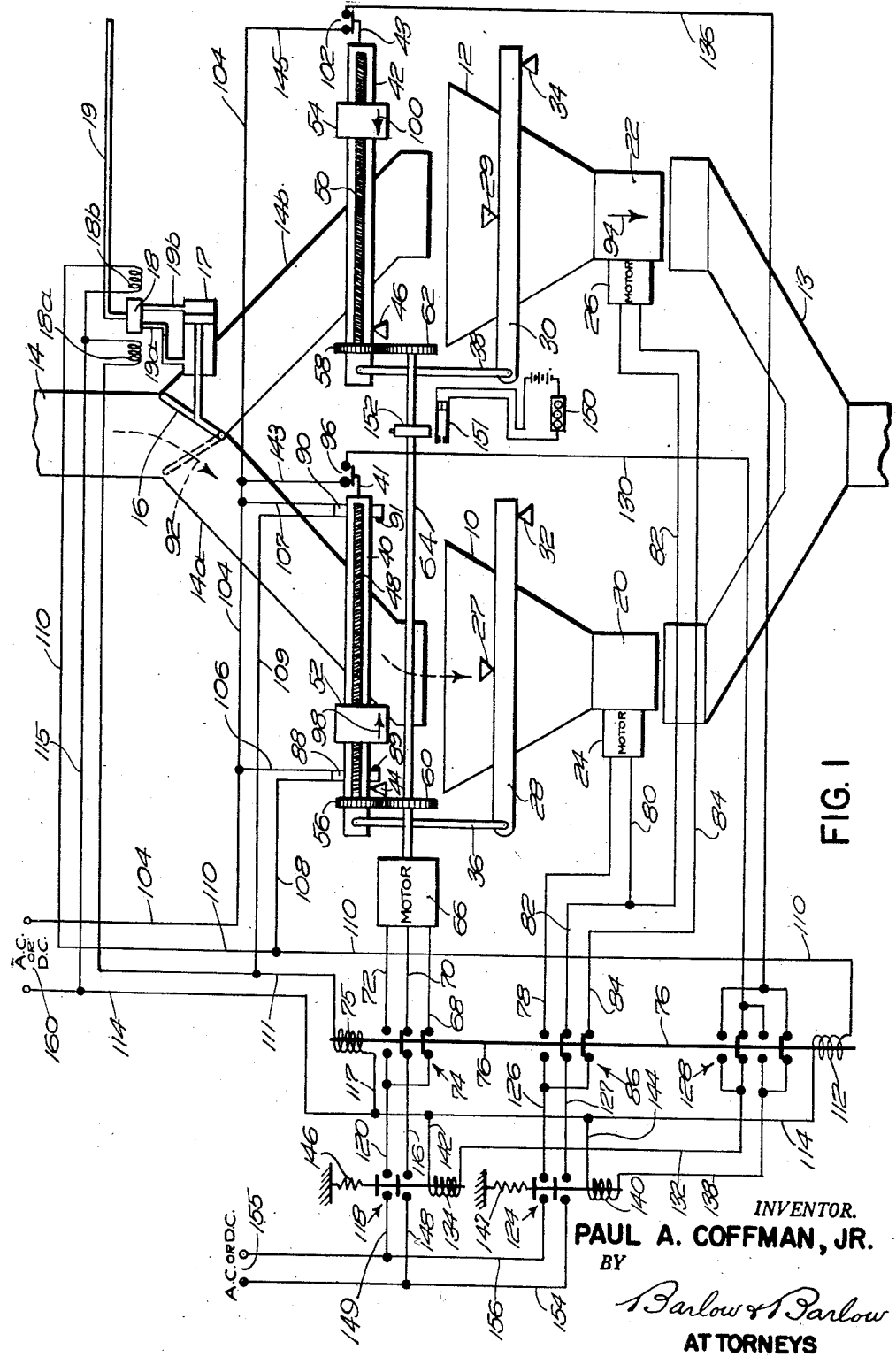
Figure 3:
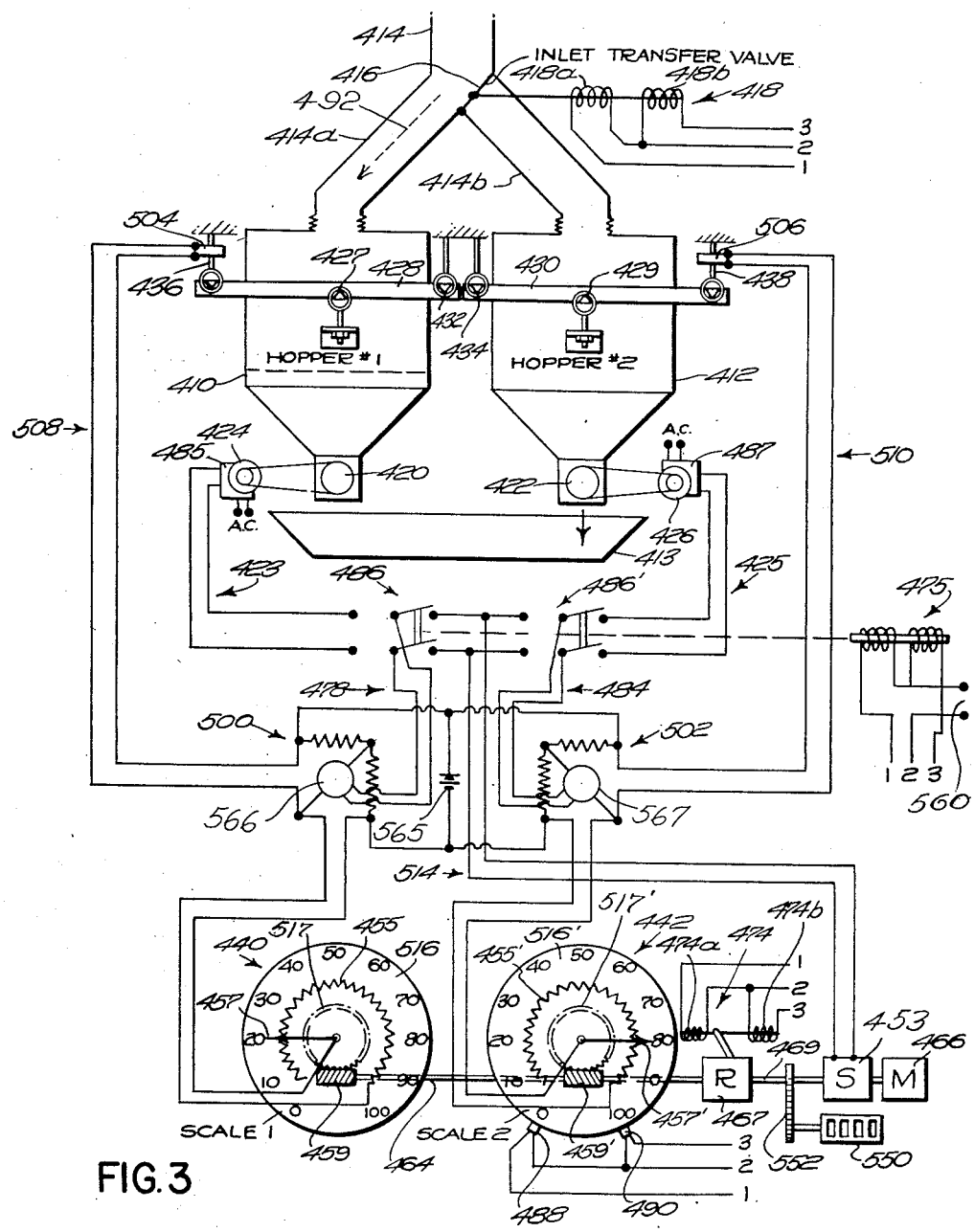

In the accompanying drawing:

Figures 1 and 2 are diagrammatic elevation views showing an embodiment of my invention employing beam balance weighing and electric and pneumatic controls, respectively; and Figures 3 and 4 are diagrammatic elevation views showing an embodiment of my invention employing transducer weighing with electric and pneumatic controls, respectively.

Referring now more particularly to the drawings, and particularly Figure 1, the apparatus there shown is intended primarily for the continuous weighing of material being supplied. There are two hoppers 10 and 12 arranged to discharge into a common receiver (not shown) such as a tank or trough or movable conveyor belt through discharge duct 13. These hoppers are themselves supplied from a conveyor duct 14 having two branches 14a and 14b and a transfer gate 16 which is operated by an air cylinder 17 and determines which hopper receives the material delivered to the apparatus by conveyor duct 14. The pilot valve 18 supplied with air through pipe 19 is actuated by solenoid coils 18a and 18b to supply air alternately through pipes 19a or 19b to actuate the piston of air cylinder 17. Should air not be readily available, the solenoids 18a and 18b may directly control the transfer gate 16. At the discharge outlets of the two hoppers 10 and 12 are rotary valves 20 and 22 which are individually driven by constant speed motors 24 and 26, respectively. The motors 24 and 26 are selectively connected through transfer switch 86 over conductor pairs 78, 82 (80) and 82, 84, respectively, from the power source 155.

The hoppers 10 and 12 are individually mounted as at 27 and 29 on levers 28 and 30 which are fulcrumed near one end thereof at 32 and 34, respectively. The other end of each lever is connected by a link 36, 38 to a scale beam 40, 42. Each scale beam is fulcrumed as at 44, 46 near its connection with its respective link, and associated with each scale beam is a lead screw 48, 50 along which a counterpoise weight 52, 54 is moved in one direction or the other according to the rotation of the lead screws. The threads of the two lead screws are reversely disposed so that when they are turned in the same direction, the poises move in opposite directions with respect to one another. The lead screws may be threaded alike and rotated in opposite directions by suitable gearing.

Each lead screw has a pinion 56, 58 which meshes with a gear 60, 62, respectively, on a common shaft 64 which extends from and is driven by a constant speed motor 66. This motor 66 is of reversible type, such as one having three leads 68, 70, and 72 leading therefrom to a reversing switch 74. Selection of the direction of rotation is secured by connecting the power source arriving over conductors 120 and 116 to the proper pair of motor wires through the reversing switch 74.

There are two limit switch devices 88 and 90 mounted near either end of the beam 40 and which are so positioned with respect to the counterpoise weight 52, that moves along the scale beam 40, that the counterpoise 52 will engage the actuating arms 89 and 91, respectively, of the switch devices 88, 90. Thus, as the counterpoise 52 nears one end or the other of its travel on the lead screw 48, it engages one or the other of the actuating arms 89 or 91 to operate control circuits which will presently be described. Actuating rods 41 and 43 are mounted on the free ends of scale beams 40 and 42, respectively, and are positioned so as to actuate additional control switches 96 and 102, respectively. As will be seen from the diagrammatic view in the drawing, these switches are responsive to the balanced condition of these scale beams 40 and 42 and are closed when the moments of the counterpoises 52 and 54 are insufficient to balance the scale beams 40 and 42. In order now to appreciate how the switches just described effect the operation of the device, the electrical circuits associated therewith will now be described.

There are two power supply sources in the present invention. A first source 155, which may be either A. C. or D. C., is utilized solely for driving the motors associated with the device; and a second source 160, which may also be either A. C. or D. C., is utilized solely for energizing the various solenoids and other control devices. The voltage of these sources is selected in accordance with the device and is in no way limited by any other factor. The power source 155 feeds via conductors 148, 149, and 154, 156 to one side of double pole single throw switches 118, 124. Each of the power switches 118, 124 is operated by a separate solenoid 134, 140, respectively, and is loaded by springs 146, 147, respectively, to be in a normally open position. The load side of switch 118 feeds motor 66 through conductors 120, 116 and reversing switch 74. The load side of switch 124, on the other hand, feeds via conductors 126, 127, transfer switch 86, the load side of which may alternately feed either motor 24 or motor 26 depending upon the position thereof.

The power supply 160 for the control circuits has a first lead 104 which feeds, respectively, a first terminal of switches 88, 90, 96, and 102 via conductors 106, 107, 143, and 145. The second lead 114 from the power supply 160 feeds, respectively, a first terminal of solenoids 18a, 18b, 75, 134, 140, and 112 via conductors 115, 117, 142, and 144. Limit switches 88 and 90 are intended generally to reverse the operation of the apparatus and specifically to operate solenoids 18a, 18b, 75, and 112. As previously described, solenoids 18a and 18b operate a pilot valve 18. Solenoids 75 and 112, on the other hand, operate upon a common shaft 76 upon which are mounted reversing switch 74, transfer switch 86, and a further transfer switch 128. To complete one of the reversing operations by the completion of a circuit across power supply 160, a lead 108 extends from a second terminal of limit switch 88 and branches into lead 110 which extends, respectively, to a second terminal of solenoid coil 18b and also to a second terminal of solenoid coil 112.

It will be seen thus that when switch 88 is closed, the circuit is completed from the supply source 160 through lead 104 and conductor 106 to switch 88, thence through lines 108 and 110 to a second terminal, respectively, of solenoid coil 18b and 112, the first terminals of which are connected to the other side of the supply source 160 through leads 115 and 114. Limit switch 90 similarly completes a circuit through solenoid coils 18a and 75 and has a main lead 109 leading from a second terminal thereof which branches into conductor 111 that connects to a second terminal of solenoid coil 18a and a second terminal of solenoid coil 75. Thus, when the limit switch 90 is closed, a circuit will be completed from one side of the control source 160 through lead 104 and branch line 107 into the switch 90 and thence out over leads 109 and 111 to a second terminal, respectively, of solenoid coils 18a and 75, the first terminal of which is connected to the other side of source 160 through leads 115 and 114, respectively.

A still further control circuit exists in my device which is designed not only to maintain the balance of the scale beams 40 and 42 by electrically controlling the advance of counterpoises 52 and 54 through the action of drive motor 66 but also controls the rotary valves 20 and 22 by electrically controlling motors 24 and 26. This control circuit is made up of control switches 96 and 102 which are respectively intended to actuate power switches 118 and 124 through the action of their solenoids 134 and 140. These solenoids are connected to one side of the control power source 160 through lead 114. If switch 96 is closed, it will be seen that the other side of the power source 160 is represented by lead 104 will be connected to one of the solenoids 134 or 140 through lead 130. With switch 128 in the position as shown in the drawing, line 104 of the source 160 will be connected to solenoid 134 through lead 132. Should, however, switch 128 be in its other position, this power would be applied through lead 138 to solenoid 140. Switch 102 on the end of scale beam 42 operates in a similar manner and with the switch 128 in the position as shown in the drawing, line 104 of the source 160 will be connected through switch 102, and lead 138 to solenoid 140. Alternately should the switch 128 be in its other position, lead 136 would be connected through the switch 128 to lead 132 and thence to solenoid 134.

Referring now to Figure 2 of the drawing wherein like parts have numerals in the two hundred series where applicable, there are two hoppers 210 and 212 arranged to discharge into a common receiver (not shown) such as a common duct or pipe, a tank, trough, or movable conveyor. These hoppers are themselves supplied from another conveyor duct 214 having two outlets 214a and 214b and a transfer gate 216 which is operated by an air cylinder 217 and determines which hopper receives the material delivered to the apparatus by duct 214. A two-way solenoid valve 218, supplied with air through pipe 219, is actuated by solenoid coils 218a and 218b to supply air alternately through pipes 219a or 219b to actuate the piston 217a of air cylinder 217.

At the discharge outlets of the two hoppers are rotary valves 220 and 222 which are individually driven by motors 224 and 226, respectively, and associated with each motor is a speed control device 223 and 225. The latter are here shown to be of the pressure actuated type, the pressure to each being connected thereto or disconnected therefrom by solenoid valves 231 and 233, respectively. Pressure conducting pipes 235 and 237 carry pressure to solenoid valve 231 from a controller 241, while a similar controller 243 is connected by pipes 245 and 247 to the solenoid valve 233. Each controller 241 or 243 is connected to a pipe 249 leading from a suitable supply of pressure and is operable by extensions 240a and 242a of scale beams 240 and 242 respectively, to modulate the pressure in lines 235 and 245 according to the direction and magnitude of the departure of each scale beam from its null or balance position. Extensions 235a and 245a of pipes 235 and 245 both lead pressure to a two-way solenoid valve 251 which connects one or the other of these extensions to a speed controller 253 depending on the position of the two-way valve 251. This speed controller is associated with a variable speed motor 266 having a dial 266a for manually adjusting its speed.

The hoppers 210 and 212 are individually mounted as at 227 and 229 on levers 228 and 230 which are fulcrumed near one end thereof at 232 and 234, respectively. The other end of each lever is connected by a link 236, 238 with a scale beam 240, 242. Each beam is fulcrumed as at 244, 246 near its connection with its respective link, and associated with each beam is a lead screw 248, 250 along which a counterpoise weight 252, 254 is moved in one direction or the other according to the rotation of the lead screws. The lead screws may have threads which are reversely disposed so that when they are turned in the same direction, the counterpoise weights move in opposite directions with respect to one another; or the lead screws may have similar threads and be rotated in opposite directions.

Each lead screw has a pinion 256, 258 which meshes with a gear 260, 262 on a common shaft 264 which extends from a reversing clutch mechanism 267 connected by a shaft 269 to the variable speed motor 266. The latter is continuously driven in one direction of rotation, but the direction of rotation of the shaft 264 may be the same as that of the motor or opposite thereto according to the position of reversing clutch mechanism 267.

The positioning of this clutch is effected by control means which also determines the action or inaction of the rotary valves 220 and 222, the positioning of the gate 216 and the positioning of the solenoid valves 231, 233, and 251. Associated with the clutch is a double acting solenoid 274 having two coils 274a and 274b and an armature 274c, the latter being connected to an arm 267a by which the clutch 267 can be shifted. When current flows through coils 274a, the armature 274c is held in the position shown in the drawing, but when the current is cut off from coil 274a and flows through coil 274b, the armature is moved to the right, causing the arm 267a to swing clockwise and reverse the clutching mechanism 267.

In the power lines to the motors 224 and 226 are switches 286 and 287, respectively, which are actuated between open and closed positions by double acting solenoids 308 and 310. Each solenoid has two coils 308a, 308b, 310a, and 310b, respectively, and depending upon which coils are energized by flow of current through them their associated switches are opened or closed. Similarly, there is associated with each solenoid valve 231, 233 and with each two-way valve 251 and 218 a double acting solenoid 312, 314, 316, and 218 having two coils 312a, 312b, 314a, 314b, 316a, 316b, 218a, and 218b, respectively. According to which coil is energized the valves 231 and 233 are either opened or closed, and the two-way valves 251 and 218 admit pressure one way or the other.

There are two limit switch devices 288 and 290 so positioned with respect to the counterpoise weight 252 movable along the scale beam 240 that as the poise nears one end of its travel, it engages one switch device and near the other end of its travel it engages the other of said switch devices. In order to appreciate how these switches effect the operation of this embodiment of the invention, the electrical circuits associated therewith will now be described.

There are two power supply sources in the present invention. A first source, which is illustrated as a three-phase type, is used solely for driving the motors associated with the device and connects to the various motor controller switches over leads 332, 334, and 336. A second source 260, which may be either A. C. or D. C., is used solely for energizing the various solenoids and other control devices. The application of power to the motors 224 and 226 is controlled by three-pole single-throw switches 286, 287, respectively, while the application of power to motor 266 is controlled by a three-pole single-throw line switch 333. Motor 266 runs continuously while the apparatus is being operated, but motors 224 and 226 are run alternately as controlled by switches 286 and 287.

The power supply 260 for the control circuits has a first lead 338 which feeds respectively a first terminal of limit switch devices 288 and 290, respectively. The second lead 374 from the power supply 260 acts as a common return and is connected to the common terminal of solenoids 274, 308, 310, 312, 314, 316, and 218 via conductors 360, 362, 364, 366, 368, 370, and 372, respectively. Limit switches 288 and 290 are intended generally to reverse the operation of the apparatus and specifically to operate the several solenoids 274, 308, 310, 312, 314, 316, and 218. If switch 290 is closed, current may then flow from one side of the power source 260 represented by lead 338 through lead 376 and lead 378 to one side of the several solenoids 274$b$, 308$b$, 310$b$, 312$b$, 314$b$, 316$b$, and 218$b$. Conversely, should limit switch 288 be closed, current would flow from one side of the power source 260 represented by lead 338 through the limit switch and thence along leads 342 and 344 to one side of the several solenoid coils 274$a$, 308$a$, 310$a$, 312$a$, 314$a$, 316$a$, and 218$a$. The coils of the various solenoids are so wound that with limit switch 290 closed, switch 287 and valve 231 are open, two-way valve 251 is positioned so that the pressure in pipe 245$a$ actuates speed controller 253 and two-way valve 218 is positioned so that pressure in pipe 219 enters cylinder 217 through pipe 219$b$. Conversely, with limit switch 288 closed, which is the condition illustrated, switch 286 and valve 233 are open, two-way valve 251 is positioned so that the pressure in pipe 235$a$ actuates speed controller 253, and two-way valve 218 is positioned so that the pressure in pipe 219 enters cylinder 217 through pipe 219$a$.

Referring now to Figure 3 of the drawing wherein like parts have numerals in the 400 series where applicable, there are shown two hoppers 410, 412 that are arranged to discharge into a common receiver or trough 413. The hoppers are supplied from a duct 414 that has two outlets 414$a$ and 414$b$. At the junction of these two outlets there is a transfer gate 416 which is positioned by a solenoid 418. The solenoid 418 is represented as having two coils 418$a$ and 418$b$ which upon energization will move the transfer valve 416 one way or the other. At the discharge outlets of the two hoppers 410, 412 are rotary valves 420, 422 which are individually driven through suitable drive means, such as a belt, by motors 424, 426, respectively. The motors 424, 426 may be supplied with power at terminals marked A. C., and started and stopped by relays 485, 487 energized by current in wires 423, 425 which are connected through transfer switches 486, 486′ to the Wheatstone bridges 500, 502. Switch 486 is connected over conductor pairs 478 to the output of a Wheatstone bridge 500, while switch 486′ is connected over conductor pairs 484 to a second Wheatstone bridge 502.

The hoppers 410 and 412 are individually mounted as at 427, 429 on levers 428, 430 which are fulcrumed near one end thereof at 432, 434, respectively. The other end of each lever is connected by a suitable means such as a link 436, 438 to an electric transducer 504, 506, such as a strain gage, variable inductance, or variable resistance, respectively. The output of these electric transducers are fed over wire pairs 508, 510 to Wheatstone bridges 500 and 502, respectively, to form one leg of the bridge as will be more fully described. Two indicating devices which may generically be called scales 440, 442 are associated with the Wheatstone bridges. These scales 440, 442 may take many forms and are here shown diagrammatically as each embodying a fixed outer ring 516, 516′. On an inner circumference of this ring 516, 516′ there may be mounted the stator portion of a rheostat or potentiometer 455, 455′. On a separate means, such as disc 517, 517′ which is concentric with the outer disc, there is mounted a movable pointer 457, 457′ which also represents the movable arm of the potentiometer, and the disc 517, 517′ is mechanically connected to a worm or other suitable drive 459, 459′. These worms 459, 459′ are mounted on a common shaft 464 which extends from a reversing clutch mechanism 467. This reversing clutch mechanism is in turn connected by a shaft 469 to a motor 466 having a controller 453. Choice of which type of mechanism 453 is dictated by whether a modulating or start stop type of control is desired. Shaft 469 is, of course, driven in one direction of rotation but the rotation of shaft 464 may be the same as that of the motor or opposite thereto according to the position of the reversing clutch mechanism 467. At each end of the pointed travel of the scale 442, which is shown as approximating 270°, a limit switch 488 and 490 may be placed, the output of these switches terminating in leads numbered 1, 2, 3 for simplicity. It will be understood that the form of the scales is purely diagrammatic, particularly with respect to the variable potentiometer included therein and that any one of the commercially available multi-turn devices may be substituted without departing from the spirit of this disclosure. It will be noted that the worms 459, 459′ are shown as having threads reversely disposed one to the other so that when the common shaft 464 turns, the pointers 457, 457′ move in opposite directions as was the case with the counterpoises in the previously described embodiments.

The positioning of the clutch 467, the switches 486, 486′, and the inlet transfer valve 416 is solely governed by the action of the limit switches 488, 490. To effect this action on the clutch 467, it is provided with a double acting solenoid 474 which has two coils 474$a$, 474$b$ terminated in leads numbered 1, 2, 3, for identification. Switch 486, 486′ is also provided with a double acting solenoid 475 of similar construction, the leads of which are numbered 1, 2, 3, for identification. It will be understood to those skilled in the art that the leads numbered 1, 2, 3 of the solenoids 418, 474, and 475 will be connected together and in turn to the leads of the limit switches 488, 490 identically numbered. Power may be supplied to operate these solenoids by leads 560 which are in effect in series with the leads numbered 2 and will thus complete a circuit to the "$a$" or the "$b$" coils of the various solenoids depending upon whether switch 488 or 490 is closed.

The Wheatstone bridges 500 and 502 in this embodiment are intended to control the discharge from the hoppers 410, 412, as the case might be, at a rate which is the same as the rate at which material is being supplied to the other hopper. They are shown as consisting of four legs, one leg of which is connected to the electric transducer 504, 506, the second leg of which is connected to the variable rheostat 455, 455′, and the third and fourth legs which consist of fixed reference resistors. A suitable source of voltage such as battery 565 is connected across one diagonal of the bridges and the outputs of the other diagonal are connected to leads 478, 484 through relays 566, 567. The output of the Wheatstone bridge which is associated with the hopper being filled is supplied through switch 486 or 486′ over conductor pairs 514 to controller 453, while the output of the Wheatstone bridge associated with the hopper being emptied is connected through the transfer switch 486 or 486' to a control relay 485, 487 of the motor driving the rotary feeder associated therewith. Unbalance in the Wheatstone bridge 500 associated with the hopper being filled, will be transmitted to the controller 453 which will start or stop, or speed up or slow down, the motor 466 thereby repositioning the rheostat 455 to restore balance in bridge 500. At the same time rheostat 455' will be repositioned, causing unbalance in bridge 502. This unbalance will be transmitted to relay 487 to run motor 422 which will discharge material from hopper 412 until the loss of weight therefrom, as sensed by weight-sensitive device 506 rebalances bridge 502. By the aforementioned mode of operation, the rate of discharge from hopper 412 wil be controlled at the rate of supply to hopper 410.

Referring now to Figure 4 of the drawing wherein like parts have reference numerals in the 600 series where applicable, there are shown two hoppers 610, 612 arranged to discharge into a common receiver 613. These hoppers are supplied from a duct 614 having two outlets 614a, 614b with a transfer gate 616 at the junction thereof, which is operated by an air cylinder 617 and determines which hopper receives the material delivered to the apparatus by duct 614. A two-way solenoid valve 618 is supplied with air through pipe 619 and is actuated by solenoid coils 618a, 618b to supply air alternately through pipes 619a or 619b to actuate the piston 617a of air cylinder 617.

The discharge of the two hoppers into the trough 613 is effected through a duct 615 which has two inlets thereto 611a, 611b from the hoppers 610 and 612, respectively. A transfer gate 621 is interposed in this outlet duct which is operated by an air cylinder 702 to determine which hopper will discharge into the trough 613. This air cylinder 702 is fed in parallel with the air cylinder 617 and is thus connected to the pipes 619a and 619b.

In the discharge duct 615 there is positioned a control valve 620 which is positioned by a diaphragm 623. A pressure conducting pipe 635 carries pressure to the diaphragm 623 from a two-way valve 651, 651' actuated by solenoid coils 718a, 718b. Another connection 645 from the transfer valves leads to a speed controller 653 which is associated with a motor 666. The two-way transfer valves 651, 651' are connected, respectively, via pipes 637, 647 to pneumatic controllers 643, 641 of a type such as Model ACH–1 Pneumatic Controller manufactured by B-I-F Industries, Inc. and shown in their Bulletin 285–M41. These controllers are in turn supplied with air pressure over pipe 649. It will be apparent that the controllers 641, 643 may be connected either to the outlet valve 620 or the speed control device 653, as the case might be, depending upon the position of the solenoid valves 651, 651'.

The hoppers 610, 612 are individually mounted on a pneumatic transducer 628, 630, respectively. The output of these transducers is fed via pipes 704, 706, respectively, to a pneumatic responsive device 708, 710, respectively, which fundamentally are pressure gages having pointers 657, 657'. As was the case of the embodiment shown in Figure 3, the pointers are part of what might be generically termed a scale means 640, 642 having indicia means shown as fixed outer disks 712, 712'. Co-axial with and intermediate the pneumatic responsive devices 708, 710 and the indicia means 712, 712' are rotatable disks 709, 711, which have affixed thereto air nozzles 714, 714'. The air nozzles are mounted so that they direct air toward abutments on the pointers 657, 657' and are supplied with air from controllers 641, 643 through rotatable joints in pipes 715, 715', respectively. The nozzles so located establish a finite pressure in pipes 715, 715' that is dependent upon the spacing of the nozzle and the abutment. As the spacing varies, the pressure in the pipes 715, 715' will vary from the reference position initially established and the controllers 641, 643 will in turn transmit this variation in pipes 647, 637, respectively, which are connected either to diaphragm 623 of valve 615 or speed controller 653. Worm gears 659, 659' are fixed to a common shaft 664 and rotate the disks 709, 711. The worm gears have threads that are reversely disposed so that when they turn in the same direction, the disks 709, 711 will rotate in opposite directions. The common shaft 664 extends to a reversing clutch mechanism 667 which is connected by a shaft 669 to the speed control device 653 and in turn to the motor 666. The latter is continuously driven in one direction of rotation but the direction of rotation of the shaft 664 may be the same as that of the motor or opposite thereto according to the position of reversing clutch mechanism 667. At each end of the pointer travel of the scale 642, a limit switch 688, 690 is placed, the output of these switches terminating in leads numbered 1, 2, 3.

The positioning of the clutch 667 is effected by a double acting solenoid 674 having two coils 674a and 674b terminating in leads 1, 2, 3. The actuation of clutch 667, valves 651, 651' and 618 is governed by limit switches 688, 690, and to that end it will be understood by those skilled in the art that the leads 1, 2, 3 are connected together, power being supplied at 655, which terminals are in series with lead number 2. Thus, when switch 688 is closed, a circuit will be completed to all the "a" coils of the various solenoids, and when switch 690 is closed, the circuit will be completed to all the "b" coils.

In order to appreciate how the various controls, pneumatic and power circuit operate in the embodiments described above, the operation of the device will now be discussed. As shown in each of the figures, the material in the "12" hoppers is being discharged therefrom under control of a suitable valve means, which in Figures 1, 2, and 3 takes the form of rotary valves 22, 222, 422 and in Figure 4 takes the form of diaphragm control valve 615. Simultaneously material in the "14" conveyor ducts is being delivered through its 14a, 214a, 414a, 614a outlet into the "10" hoppers as indicated by the arrows 92, 292, 492, 692. The shafts 64, 264 are being rotated in a direction to cause the poises 52, 252 (Figs. 1 and 2) to move to the right as indicated by arrows 98, 298 and to move the poises 54, 254 to the left as indicated by the arrows 100, 300. Likewise, in Figure 3, the shaft 464 rotates the pointer 457 in a clockwise direction, while the pointer 457' will be rotating in a counter-clockwise direction. In Figure 4, the disk 709 will be rotating in a clockwise direction and the disk 711' will be rotating in a counter-clockwise direction, these rotations all under the actuation of the shaft 664.

Let us assume in Figures 1 and 2 that the movement of the "52" poises effective on their respective scale beams is balanced by the movement of the combined weights of the "10" hoppers and the material therein. Also assume in Figure 3 that the Wheatstone bridge 500 is balanced and in Figure 4 that the position of pointer 657 and nozzle 714 are at their null position with reference to each other. Additionally, assume that a similar balanced condition is present in connection with the "12" hoppers and their associated mechanism which duplicates that of the "10" hoppers. As additional material is delivered to the "10" hoppers, the combined weight of the hopper and the material therein, which is in effect acting on the scale beams and "40" scales, of necessity increases. However, while this is happening, the scales are in effect being unbalanced in Figs. 1 and 2 by the movement of the "52" poises and in Figs. 3 and 4 by the movement of the pointer 457 or the nozzle 714. Similarly but reversely, as material is being discharged from the "12" hoppers, the scales associated therewith are being unbalanced in a reverse direction so as to attempt to compensate for the discharge of material therefrom. In due course the poises 52, 252, the pointer 457', and the nozzle 714' will engage the "90" limit switch devices, whereupon the delivery to the "10" hoppers will be stopped, delivery to the "12" hoppers started, the discharge from the "12" hoppers stopped, and the discharge from the "10" hoppers is begun. It will be understood that the reverse sequence of events will occur when the "88" limit switch devices are engaged.

When the "90" limit switch is engaged, the following sequence of operation takes place in each of the various figures. In Figure 1 solenoid 75 is energized to reverse the direction of motor 66; switch 86 is actuated to transfer control of power from the rotary valve 22 to the rotary valve 20; and switch 128 transfers the control of power to the motor 66 and the respective rotary feeder from switch 43 to switch 41. Additionally, a circuit is closed through solenoid 18a, which moves the valve 18 and admits air into pipe 19b, thereby moving the piston in cylinder 17 to swing the gate 16 so that material will be supplied to the hopper 12. In Figure 2 the actuation of the limit switch 290 will stop the flow of current to all the "*a*" coils of the several solenoids and connect the current from the source 260 to the several "*b*" coils. This results in switch 286 and valve 233 being closed and simultaneously switch 287 and valve 231 being opened. Also the two-way valve 251 is positioned so that pressure in pipe 245a actuates speed controller 253 and the two-way valve 218 is positioned so that the pressure in pipe 219 will be conducted through pipe 219b and through the actuation of the piston 217a swing the gate 216 to the left and allow material to be supplied to hopper 212. Finally the clutch mechanism 267 is shifted to reverse the rotation of shaft 264. In Figure 3 the energization of the limit switch 490 will cause a flow of current in leads numbered 2 and 3 and thus actuate the "*b*" coils of the solenoids 474, 475, and 418, which respectively reverse the rotation of shaft 464, operate transfer switches 486, 486' and swing the gate 416. In Figure 4 the operation of the switch 690 will similarly energize leads numbered 2 and 3, energizing the "*b*" coils of the three solenoids to operate two-way valves 618, 651, 651' and the reversing switch 667. The inlet and outlet transfer valves 616, 621 will be reversed by this operation and the output of the pneumatic controls 641, 643 be applied reversely from the speed controller 653 and outlet valve 615.

The cycling outlined above can continue indefinitely as long as material is fed to the "14" inlet ducts and the scale devices associated with the hoppers remain in a balanced condition. If for any reason the rate of supply from the "14" inlet ducts should vary, the scale associated with the hopper being filled will respond to this variation and affect its associated controller, which in Figure 1 consists of the switches 41, 43, in Figure 2 the controllers 241, 243, in Figure 3 the Wheatstone bridge 500, 502, and in Figure 4 the pneumatic controllers 641, 643. For example, let us assume that the material being delivered to the "10" hoppers is at such a fast rate that the weight of this hopper being transmitted to the associated scale is greater than the movement of the poises or pointers. Unbalances will occur, which in Figure 1 will close switch 41 to run motor 66 and move the counterpoise 52 until balance is again established. In Figure 2 increased rate of inflow will actuate controller 241 to vary the pressure in pipe 235, which will be transmitted to speed controller 253 and thus speed up shaft 264 to move poise 252 to restore the balance. In Figure 3 the strain gage 504 will create an unbalance in bridge 500 which will be transmitted through leads 514 to speed controller 453 and increase the speed of shaft 464 to move pointer 457 over rheostat 455 to restore balance in the bridge 500. In Fig. 4, pressure cell 628 will transmit an increased pressure to scale 640 which will move pointer 657 clockwise toward nozzle 714. Closure of the nozzle will actuate controller 641 and through valve 651' the speed controller 653 will operate to increase the speed of shaft 664 which moves the nozzle 714 clockwise away from pointer 657 until a balance is restored. Associated with the above-described effects of increasing inflow, each of the embodiments will automatically adjust the outflow rate from the "12" hoppers as follows:

In Fig. 1, operation of the motor 66 by the switch 41 to move the poise 52, will at the same time move the poise 54 an equal distance to the left as shown by arrow 100. This will close switch 43 thereby energizing solenoid 140 and running motor 26 to discharge material from hopper 12 until scale 42 is again in balance.

In Fig. 2, the poise 254 will similarly be moved to the left, thereby operating the controller 243 to actuate speed controller 225 to increase the rate of discharge from hopper 212 until scale 242 is restored to balance.

In Fig. 3, the operation of shaft 464 will also move pointer 457' in a counterclockwise direction thereby changing the rheostat 455' and unbalancing the bridge 502. Motor 426 will run to discharge material from hopper 412 until the impedance in transducer 506 restores the bridge 502 to balance.

In Fig. 4, movement of the shaft 664 will also move the nozzle 714' counterclockwise toward the pointer 657' thereby operating the controller 643 which, through valve 651, opens the valve 620 to increase the rate of discharge from hopper 612. Pneumatic cell 630 will transmit the reduced weight of hopper 612 to the pointer 657' and move the pointer counter-clockwise away from the nozzle 714' until a balance position is reached. Reversely, if the delivery of material to the "10" hoppers is for any reason interrupted or slowed down, the apparatus in Figs. 1 and 3 will remain inactive until sufficient material is added to hopper 10 or 410 to operate the switch 41 or the bridge 500; and in Figs. 2 and 4 the speed of shafts 264, 664 will be reduced thereby slowing down the rate of discharge from hoppers 212 and 612. It will thus be apparent that whatever the rate of supply from the "14" inlet ducts, the discharge will be controlled at a corresponding rate, and the number of excursions made by the poises along their scale beams or the number of turns of the lead screws of the "64" shafts will be a measure of the total weight of material that passes through the apparatus. One form which a register may take is shown in Figures 1 and 2 as a solenoid-operated totalizer 150, 350 that is actuated by a switch 151, 351 having its circuit closed every revolution of shafts 64, 264 by cams 152 or 352 mounted thereon regardless of direction. In Figures 3 and 4 there is illustrated a register 550, 750 as being coupled to the shafts 469, 669 through suitable gearing such as is indicated at 552 and 752 so that it will register the complete number of revolutions of the shaft or any division thereof according to the gear ratio.

The term weigher or weighing device as used herein is a device in which the delivery of material thereto may be at any weight rate and in which the discharge therefrom keeps step with the delivery weight rate, as contrasted to a feeder in which the delivery and discharge rates are predetermined and maintained constant. The term "continuous" implies an uninterrupted phenomenon as well as an intermittent or successively recurring operation and is intended to convey the impression that the device will handle all material delivered to it without any lag and thus prevent backing up of the delivery means.

I claim:

1. Continuous weighing apparatus comprising at least one pair of containers, means for continually supplying material to said apparatus including means to supply alternately one container at a time, means continuously indicating the weight of material in both of said containers comprising at least two weighing devices, one weighing device coupled to one container and the other to the second container, a discharge valve including an actuator therefor at the output of each of said containers for controlling the discharge of material therefrom, a first means including the weighing device of both containers responsive to the weight gain in the first filling container to control the actuation of the discharge valve of the second discharging container to discharge material therefrom at the same weight rate that material is supplied to the first container, and a second means responsive to a predetermined total weight in the first container to transfer the supply of material from the first container to the second container and to transfer control from the discharge valve actuator of the second container to the discharge valve actuator of the first container the first container thereby becoming the discharging container and the second container becoming the filling container, this transfer being reversed when the second container receives a predetermined weight of material.

2. An apparatus as in claim 1 wherein the weighing device comprises a beam balance and counterpoise couple to each container, the position of said counterpoises being controlled by drive means actuated by balance sensing means.

3. An apparatus as in claim 1 wherein the weighing device includes an electric sensing element.

4. An apparatus as in claim 1 wherein the weighing device includes a pneumatic transducer sensing element.

5. Continuous weighing apparatus as in claim 1 wherein counter means are coupled to said predetermined total weight responsive means to indicate the amount of material passed through both of said containers.

6. Continuous weighing apparatus comprising two containers, two beam balances, each container coupled to a separate beam balance having a counterpoise, a supply of material, means for directing said supply into the first container, valve means having control of each container for discharging material, electrical means coupled to means on each beam balance responsive to the balance thereof, said electrical means controlling means to advance one counterpoise and retract the other thereby maintaining a balanced condition, said electrical means also controlling said valve control to discharge material from the second container at the same rate material is supplied to the first container and electrical control means positioned near each end of travel of one of the counterpoises to shift the supply of material to the second container and at the same time operating said electrical valve control to close the second container and discharge material from the first container, this shift and valve operation being reversed by the other electrical control means when the second container receivers a predetermined weight of material.

7. Continuous weighing apparatus comprising two containers, two beam balances, each container coupled to a separate beam balance, each beam balance having a counterpoise, a supply of material, means including a transfer gate to direct said supply into the first container, rotary valve means on each container for discharging material therefrom, said rotary valve means actuated by an electric motor, circuit interrupting means affixed to each beam balance and responsive to the balance of the beam, a reversible electric motor, said reversible motor having a supply switch in circuit therewith, the shaft of said motor coupled to said counterpoises to advance the counterpoise associated with the first container and retract the counterpoise associated with the second container, said electrical circuit interrupting means controlling said supply switch to move said counterpoises and maintain said beams in balance and also controlling the electric motor driving the rotary valve means on the second container to discharge material from the second container at the rate material is supplied to the first container, limit stop means positioned near one end of travel of one of said counterpoises to actuate said transfer gate to direct the supply into the second container, said limit means additionally reversing said reversible electric motor to change the direction of travel of said counterpoises and shift the control from the electric motor driving the rotary valve means on the second container to the electric motor driving the rotary valve means on the first container, second limit stop means near the other end of travel of said one counterpoise being actuated when the second container receives a predetermined weight of material thereby reversing the action of the first limit stop means.

8. Continuous weighing apparatus comprising two containers, two beam balances, each container coupled to a separate beam balance having a counterpoise, a supply of material, means for directing said supply into the first container, valve means having a pneumatic controller on each container for discharging material, pneumatic means coupled to means on each beam balance responsive to the balance thereof, said pneumatic means controlling means to advance one counterpoise and retract the other at a rate proportional to the amount of beam unbalance thereby maintaining a balanced condition, said pneumatic means also controlling said pneumatic controller to discharge material from the second container at the same rate material is supplied to the first container, and means responsive to a predetermined weight in the first container to reverse the travel of said counterpoises and change the supply of material from the first container to the second and the discharge from the second to the first container, this reversal and supply change being again changed when the second container receives a predetermined weight of material.

9. Continuous weighing apparatus comprising at least two containers, each container coupled to a weighing device including an electric transducer, a supply of material, supply means to alternately direct material into said containers, valve means on each container for discharging material therefrom, two bridge circuits, the output of the transducer coupled to the container being supplied feeding one bridge circuit, the output of said one bridge circuit controlling a motor, said motor being coupled to a variable element in said bridge circuit to reestablish balance in said bridge circuit, the position of said variable element indicating weight, the output of the transducer coupled to the discharging container feeding the other bridge circuit, a second variable element coupled to said motor in the other bridge circuit, the output of the other bridge circuit controlling the discharge valve at the discharging container so that material will be discharged from one container at the rate material is supplied to the other and limit means associated with said variable element to operate said supply means and direct material into the container which has been discharging, said limit means switching the output of the bridge circuits to interchange the control of the motor and the discharge valve at the container which has been discharging to the now filled container, this interchange being reversed when the now filling container receives a predetermined amount of material.

10. Continuous weighing apparatus comprising at least two containers, each container coupled to a weighing device including a pneumatic transducer, a supply of material, supply means to alternately direct material into said containers, discharge means to alternately discharge material from said containers, valve means for controlling the discharge of material, weight indicating means including a movable arm connected to each pneumatic transducer, a source of air pressure, a pneumatic controller for each container, said source connected through each pneumatic controller to separate outlets each mounted on a movable means mechanically coupled together adjacent each of said arms, said pneumatic controllers responsive to pressure variations at said outlets, one controller being associated with the filling container and having its output coupled to control the movable means, means including a pipe connecting the valve means to the pneumatic controller associated with the discharging container whereby the movable means, through the pneumatic controllers, adjust the discharge valve means to discharge material at the same rate material is supplied and limit switches associated with said movable means to operate said supply and discharge means to transfer the supply of material from one container to the other and to interchange control of the discharge valve and movable means, the interchange being reversed when the now filling container receives a predetermined amount of material.

References Cited in the file of this patent

UNITED STATES PATENTS

| | | |
|---|---|---|
| 593,455 | Braun | Nov. 9, 1897 |
| 1,527,633 | Debay | Feb. 24, 1925 |
| 2,072,326 | Forster | Mar. 2, 1937 |
| 2,134,669 | Page | Oct. 25, 1938 |